May 30, 1950  A. J. BIELSKI  2,509,471
CONTROL APPARATUS
Filed April 30, 1947  5 Sheets-Sheet 3

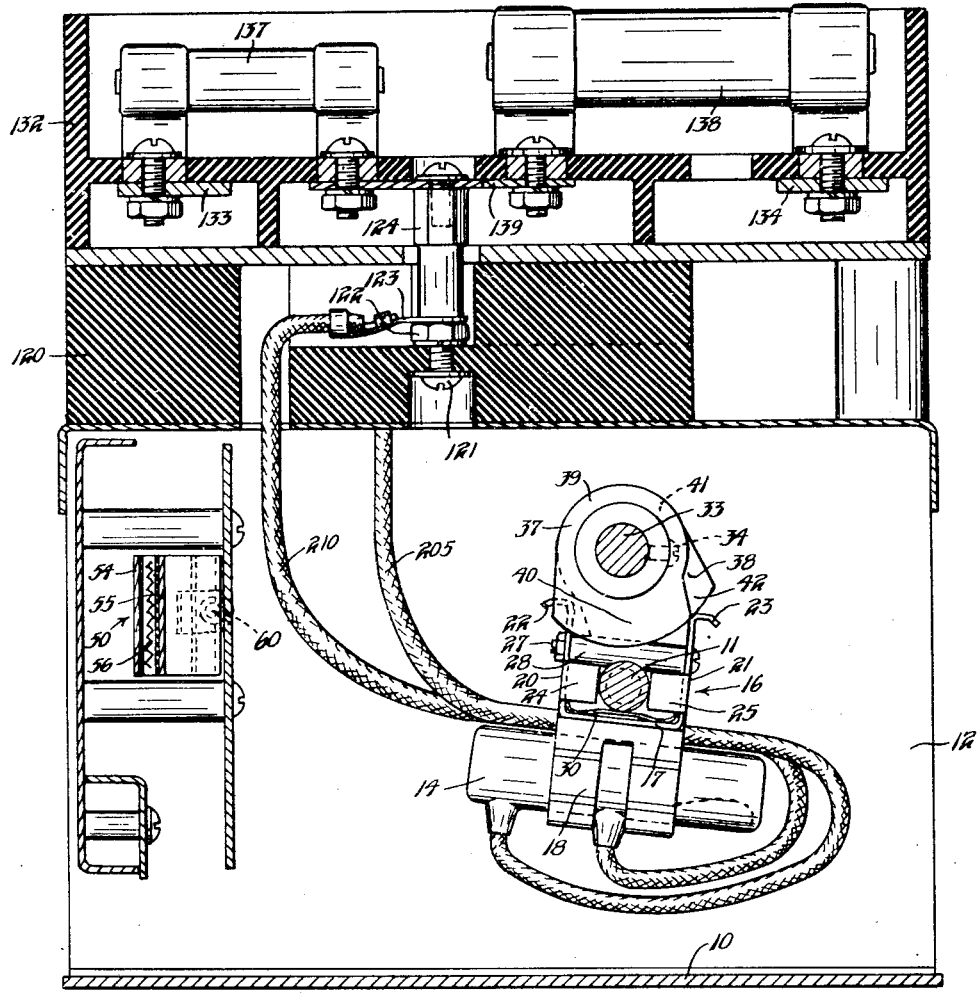
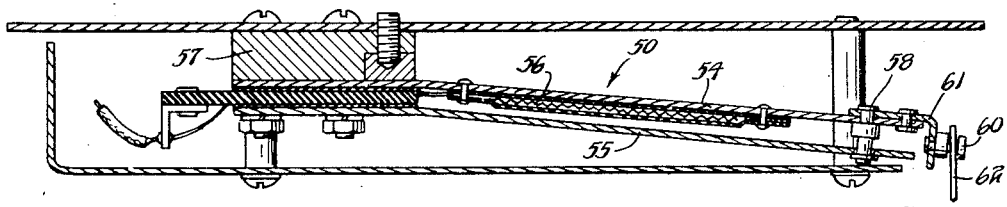

Inventor
ALEXANDER J. BIELSKI
By George H. Fisher
Attorney

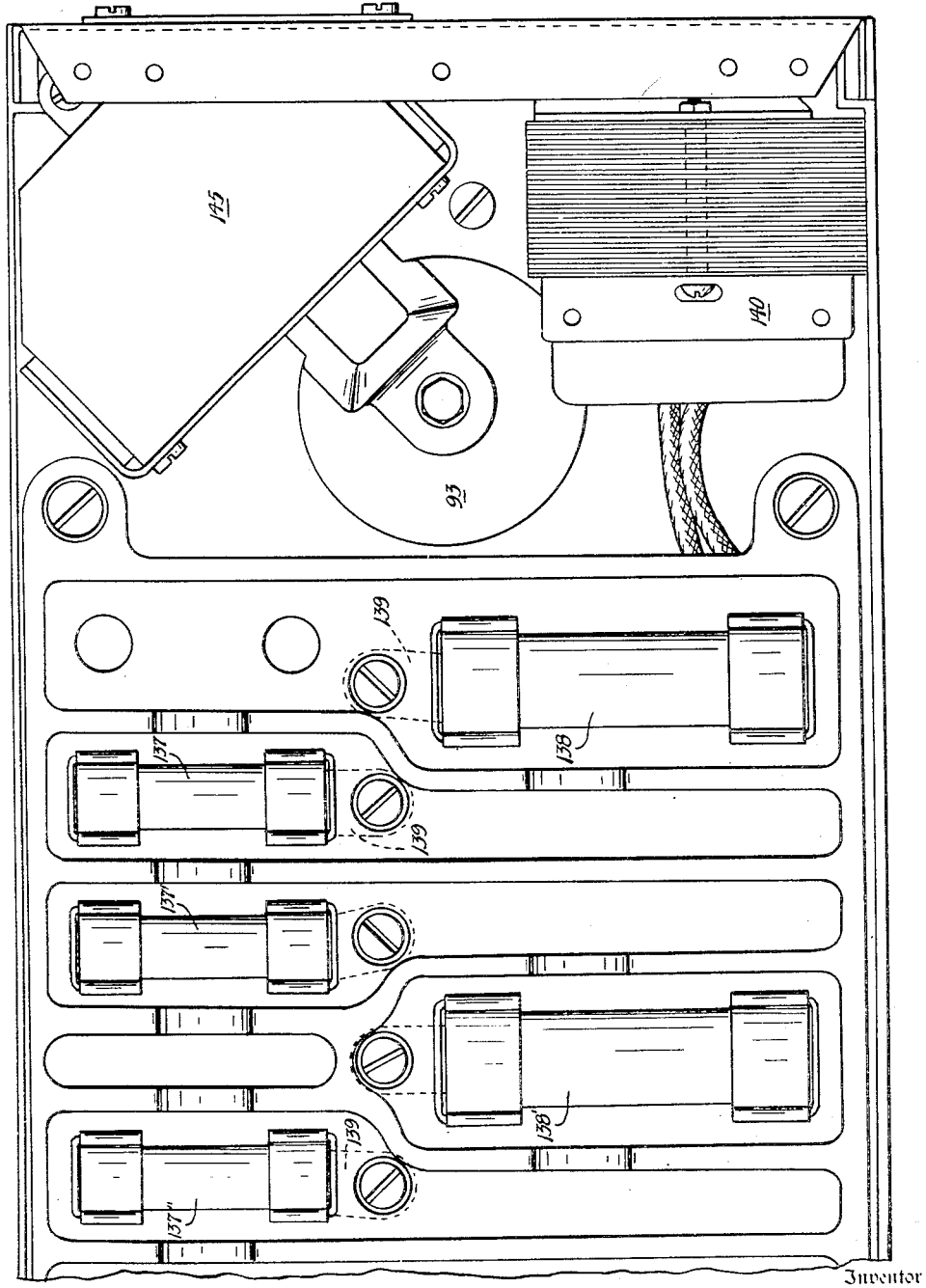

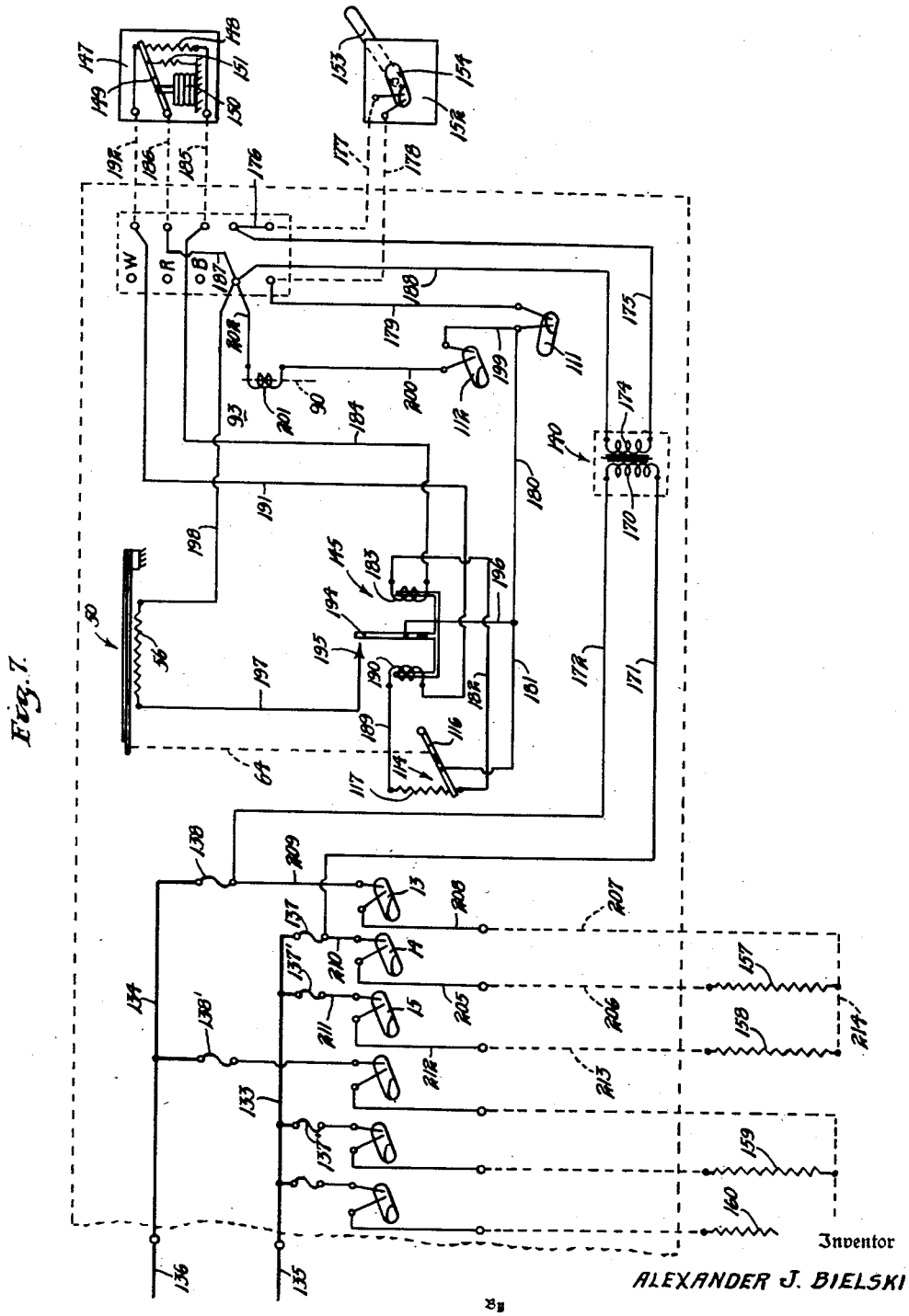

Patented May 30, 1950

2,509,471

UNITED STATES PATENT OFFICE 2,509,471

CONTROL APPARATUS

Alexander J. Bielski, Minneapolis, Minn., assignor to Minneapolis-Honeywell Regulator Company, Minneapolis, Minn., a corporation of Delaware Application April 30, 1947, Serial No. 744,956

19 Claims. (Cl. 318—29)

The present invention relates to a fail safe step controller for electric house heating control.

In controlling relatively large electric currents, as in house heating, it is not only desirable to control the current in steps or increments to meet power company requirements and for nicety of heat control but it is essential that, upon a power failure or limit switch action, the load be immediately removed from the line and restored only by steps or increments with an appreciable time delay between said steps or increments. This feature of immediately disconnecting the load from the supply line upon power failure or limit switch action and permitting restoring of the load only by the predetermined steps or increments is commonly termed "fail safe" and obviously has the purpose of preventing overloading of the power supply line after power stoppages, limit switch action, or the like. It is therefore a principal object of this invention to provide an improved step controller having "fail safe" characteristics.

It is a further object to provide an improved and simplified step controller which is positive and dependable in operation and which cannot be placed in operation until the motor of the controller is in a predetermined initial operative position.

It is another object to provide a control device having an operating motor and a clutch mechanism, and means for permitting declutching at any time and reclutching only when the operating motor is in an initial position.

It is a further object to provide a control device having means for breaking or disconnecting both sides of the line in the "off" position, thereby eliminating the possibility of the heating elements remaining on through an accidental ground connection.

It is also an object to provide a controller operable by a heat motor and having a follow-up means driven by a shaft of the controller.

It is an additional object to provide a controller having improved switch mounting means.

It is a further object to provide a multiple switch controller having a terminal block and a fuse block superimposed thereon and having improved electrical connections therebetween.

It is another object to provide a control system for an electrical heating system wherein the heating currents are controlled by steps or increments and wherein the entire load is immediately disconnected upon a circuit failure or due to the overheating of the heating system.

It is a further object to provide a heat motor actuated device having follow-up means operated in response to the operation of the device and including a relay jointly operable by said follow-up means and a controller.

It is a further object to provide a cam operated switch carrier wherein said switch carrier can be positively operated in either direction but cannot be accidentally moved in either direction.

These and other objects will become apparent upon a study of the following specification and drawings wherein:

Figure 2 is a cross section taken on the line 2—2 of Figure 1.

Figure 5 is a horizontal section of the heat motor seen in part in Figures 2 and 4.

Figure 6 is a plan view of a portion of the present controller showing the arrangement of some of the parts.

Figure 7 is a schematic connection diagram of the present apparatus.

Figure 1:
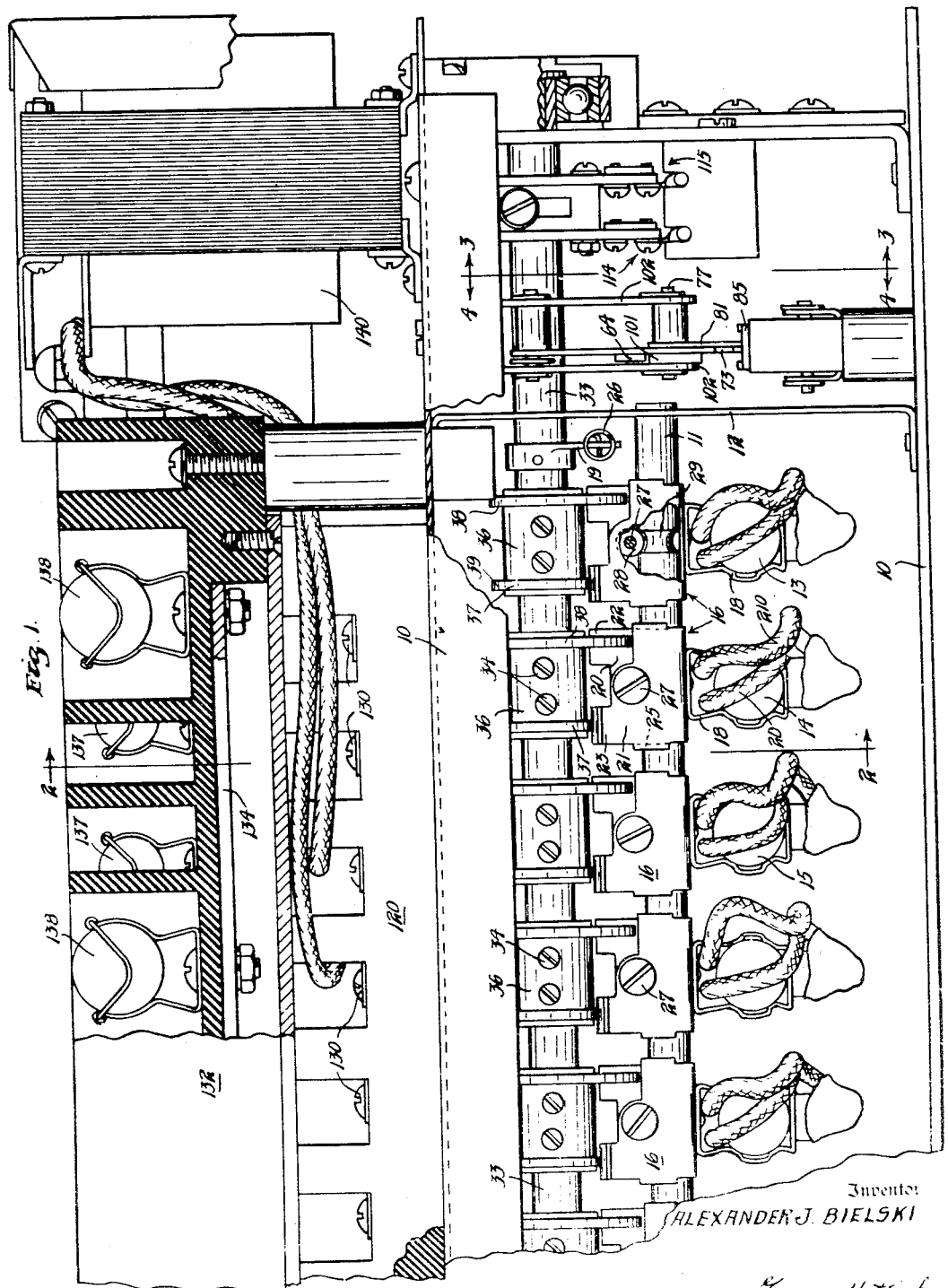
Figure 1 is a side elevation of the present step controller, with parts broken away and parts in sections.

Referring to the drawings, chassis 10 forms a framework in and on which is mounted the apparatus comprising the present step controller. A switch shaft 11 is fixedly attached to an end plate (not shown) and a partition 12 of chassis 10, the several load switches of the controller being pivotally mounted along this shaft. The load switches, of the mercury type and of which 13, 14 and 15 are examples, are carried by mounting clips 18 attached to follower member 16.

Each follower member 16 includes a base portion 17 to which is attached a switch clip 18 and further includes side wall portions 20 and 21 bent up from the base 17. Wall portion 20 is extended upwardly near one end to form a cam follower portion 22, and wall portion 21 is similarly constructed to form a cam follower portion 23 offset from portion 22 (Figs. 1 and 2). In addition, tongues 24 are bent inwardly from side wall 20 at each end of the same and tongues 25 are likewise bent inwardly from side wall 21, tongues 24 and 25 being proportioned and arranged so that they, in conjunction with base 17, form a groove for locating or guiding follower member 16 on shaft 11. A bolt 27 extending through a spacer 28 maintains the side walls 20 and 21 in correct position and the spacer 28 rides in circumferential groove 29 in shaft 11 to locate each member 16 in its proper spaced relation along said shaft. A light spring 30 may be used between shaft 11 and base 17 of member 16 to take up any unnecessary clearance between the member and the shaft. Thus, due to the coaction of base 17 and spring 30, tongues 24 and 25 and spacer 28 with shaft 11, each follower member 16 is free to rotate on the shaft 11 but cannot tip or tilt in a direction other than desired and cannot slip along shaft 11 due to the aforementioned coaction of spacer 28 with circumferential groove 29.

A cam shaft 33 is rotatably mounted a short distance above and parallel to shaft 11 and carries a plurality of cam assemblies 36 each arranged for coaction with follower portions 22 and 23 of member 16. Cams 37 and 38 of an assembly 36 are generally similar in shape, cam 37 having a low portion 39 and a high portion 40, while cam 38 has a low portion 41 and a high portion 42. Low portions 39 and 41 are preferably of the same radius and extent, and high portions 40 and 42 are of similar radius and extent, with portions 40 and 42 being angularly displaced a slight amount, as best shown in Figure 2. Cams 37 and 38 are so arranged that cam 37 coacts with follower portion 23 and cam 38 coacts with follower portion 22. Further, as best shown in Figure 2, cams 37 and 38 are so proportioned that when high portion 40 of cam 37 engages follower portion 23 to tip the switch 14 as shown, low portion 41 of cam 38 engages follower portion 22 to prevent further tipping of switch 14 in the same direction. Likewise, upon a reverse operation of switch 14 by cam shaft 33 and cams 37 and 38, high portion 42 of cam 38 will then engage follower 22 and low portion 39 of cam 37 will engage follower portion 23 to hold switch 14 and its follower member 16 positively. Cam assemblies 36 are secured to shaft 33 by set screws 34 and are so arranged that the load switches carried by the follower member 16 will be operated in a desired sequence upon rotation of shaft 33.

Figure 4:
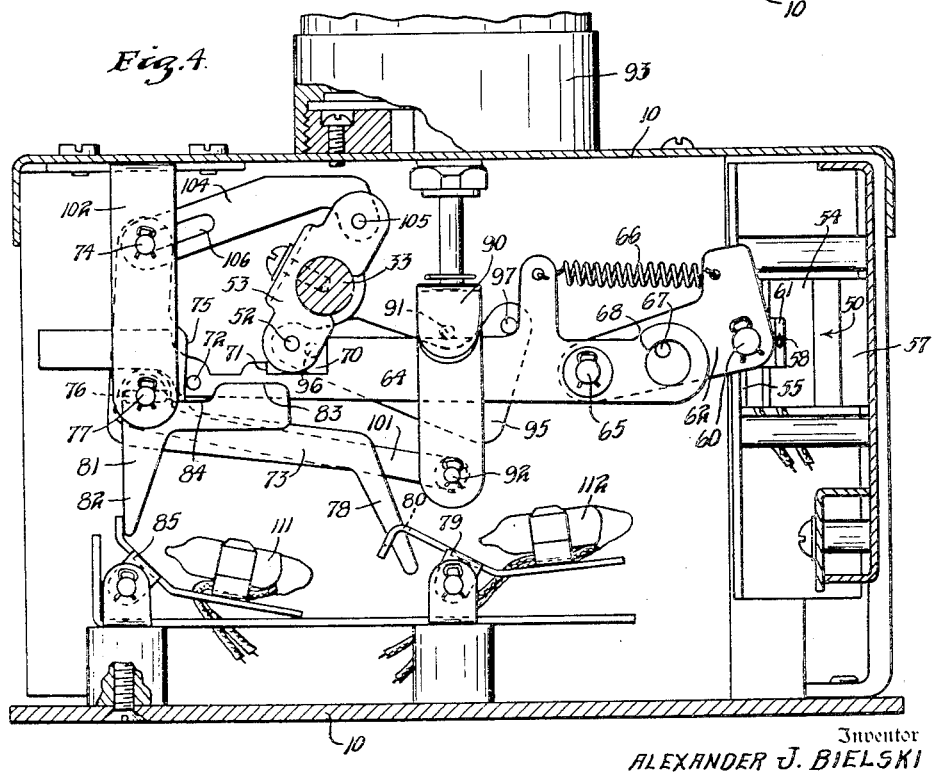
Figure 4 is a cross section taken on the same line as 3—3 of Figure 1 but viewed in a reverse direction as indicated by the numerals 4—4.

Cam shaft 33 is biased in a switch opening position, counterclockwise in Figure 2 or clockwise in Figure 4, by tension spring means 26 attached to chassis 10 (at a point not shown) and to a lever arm 19 which is secured to shaft 33. (See Fig. 1.) A heat motor 50, shown in Figures 2, 4 and 5, is attached to the back portion of chassis 10 and is arranged to be connected by links 62 and 64 to crank pin 52 carried by a crank arm 53 attached to shaft 33.

Heat motor 50 comprises a pair of spaced bimetal strips 54 and 55 having a heater element 56 disposed between them. At one end, the bimetal strips are securely anchored to a stationary block 57, and the other ends of the strips are secured together by a pin 58, provision being made for slight movement of one strip relative to the other. A pivot pin 60, secured by a bracket 61 to the end of the bimetal strip 54, serves to connect the heat motor 50 to link 62. As shown in the drawings, the heat motor 50 is in its normal cold position and is arranged to move link 62, to the right in Figure 4 or upwardly in Figure 5, when the heating element 56 is sufficiently energized. The energization of heating element 56 of motor 50 is controlled by a balanced relay 145, preferably of the sort disclosed in Gille Patent No. 2,169,141, issued August 8, 1939, although any relay capable of controlling a circuit in response to variations in the balance of a control network circuit may be used. As shown in Figure 7, relay 145 includes a switch arm 194, a contact 195 engageable thereby, and opposed windings 183 and 190.

Links 62 and 64 are pivotally connected at 65 and spring 66 is arranged to bias 64 clockwise relative to 62, the relative rotation of these links being limited by pin 67 in member 62 coacting with an opening 68 in the right end portion of link 64. Links 62 and 64 are pivotally connected so that link 64 can remain substantially horizontal as it is moved up or down, as in the following description.

Link 64 has a notch 70 near its left end, the notch being terminated on its left side by an abutment face 71. Abutment face 71 is adapted to engage crank pin 52 when link member 64 is moved upwardly a sufficient distance, as will be described. A pin 72, located to the left of abutment face 71 in link member 64, is arranged to engage surface 75 of a lever 73, said lever 73 being pivoted at 74 to bracket members 102. Lever 73 includes a slot 76 which coacts with a stationary pin 77 to limit the pivotal movement of the same and also includes a switch operating portion 78. Portion 78 of lever 73 engages a slot 80 in a pivoted lever 79 in a manner to open the contacts of a mercury switch 112 carried by lever 79 when pin 72 engages surface 75 and causes clockwise rotation of 73, and to close the contacts of said switch when pin 72 disengages surface 75.

A second switch operating lever 81 is pivotally mounted on pin 77 and includes a switch operating portion 82, a horizontal pin engaging surface 83 and a notch 84. Lever portion 82 engages a pivoted switch carrying lever 85 in a manner to open the contacts of mercury switch 111 carried by lever 85 when lever 81 is rotated clockwise and to close the contacts of the same when 81 is rotated, or permitted to rotate, counterclockwise. Switch 112 is used to control solenoid apparatus 93 and switch 111 controls the heater element 56 and control circuits, to be described, as the only object of switch 112 is to deenergize the solenoid when it is not needed, this switch can be eliminated if desired.

A plunger mechanism 90 including a top pin 91 and a bottom pin 92 is arranged in straddling relation to link 64 and is operated by solenoid apparatus 93 so that when the solenoid is energized, plunger mechanism 90 is pulled upwardly, pin 92 engages the bottom of link 64 and moves it upwardly and thus moves abutment face 71 into a position to engage crank pin 52 upon movement of link 64 to the right (Figure 4). Pin 91 is located so that when the solenoid is deenergized and the plunger mechanism is permitted to fall, pin 91 can push lever 64 downwardly to disengage face 71 from crank pin 52. To be more sure that face 71 will be disengaged from crank pin 52, a lever 95 is pivoted on crank pin 52 and has a short pin 96 secured thereto and so arranged that when the lever 95 is in the position shown, the bottom portion of pin 96 is below crank pin 52 but when lever 95 is raised by bottom pin 92 of plunger mechanism 90, pin 96 is raised above crank pin 52. A stop 97 limits the downward movement of lever 95 relative to link 64. A link 101 is pivotally attached to pin 92 of plunger mechanism 90 and is also pivotally secured to pin 77 in brackets 102, link 101 having the sole purpose of guiding plunger mechanism 90 and preventing twisting thereof. A link 104 is pivotally connected at 105 to crank member 53 and includes a slot 106 for coacting with pivot pin 74 to limit the angular rotation of shaft 33, rotation being limited to about 60° in the present instance.

While any suitable solenoid or similar electromagnetic apparatus may be used in the present controller, the solenoid structure disclosed in Gille Patent 2,114,961, issued April 19, 1938, is quite satisfactory.

In addition to the cam assemblies 36 adjusted by shaft 33, potentiometers 114 and 115 are also adjusted thereby, potentiometer 114 being connected to relay 145 for functioning as a follow up potentiometer in the control circuit, to be described, and the other potentiometer being available for controlling other apparatus if desired, its connections being identified as W, R and B in Figure 7. Potentiometer 114 includes a wiper 116 attached to shaft 33 and movable over a resistor 117.

It is preferable that the control circuit above referred to be of low voltage; hence, a transformer 140 is provided, transformer 140 having a line voltage primary winding 170 and a low voltage secondary winding 174.

In the normal use of the present controller, a proportioning thermostat 147 is arranged to respond to the temperature of the space being controlled. This thermostat includes a resistor 148 and a wiper 149 adjustable over the resistor by temperature responsive bellows 150 acting in opposition to a spring 151. This is a conventional thermostat for proportioning control and is shown in greater detail in Cunningham Patent 2,041,050 issued May 19, 1936. In this thermostat, the resistor wiper 149 is adjusted to the upper extreme of resistor 148 when the room temperature is relatively high and is adjusted to the bottom portion of the resistor as the room temperature decreases.

In addition to thermostat 147, a limit controller 152 is generally provided in a heating system and comprises a thermally responsive element 153 arranged to operate a mercury switch 154 or the like, to open circuit position upon the attainment of an undesirably high temperature in some portion of the heating system, as in the bonnet portion of the furnace which contains the heating elements 157, 158, 159, 160 and so on, shown in Figure 7.

To facilitate connecting heater elements 157, 158, 159 etc. to load switches 13, 14, 15 and others, a terminal block 120 is mounted on chassis 10 and the leads from the respective switches are attached to this block. One of the leads of each load switch, such as 210 of switch 14, is connected to a terminal structure comprising a bolt 121, nut 122, connector 123 of lead 210, and a pedestal nut 124 which clamps connector 123 to bolt 121. The other lead of each switch, such as 205 of switch 14, is connected by a suitable bus bar to a terminal 130. A fuse block 132 is superimposed on terminal block 120 and carries sufficient fuses to fuse both sides of the circuits controlled by the aforesaid load switches. Bus bar 133 is connected to the left end on each of the smaller fuses 137 while bus bar 134 is suitably connected to the right end of each of larger fuses 138, bus bars 133 and 134 being connected to power supply lines 135 and 136, respectively. The inner end of each of the fuses is secured to a flexible bus bar 139 which is bolted, through suitable openings in fuse block 132, to the top portion of its respective pedestal nut 124. With this arrangement, all the connections with the fuses in the fuse block are available from the top side of the block and, because of the flexibility of bus connections 139, a good electrical contact is had with each of the pedestal nuts, even though they may be slightly out of alignment and some higher or lower than others. Obviously, the necessary fuses can be located in separate boxes if desired and even the terminal block can be eliminated if this be found desirable. To more fully explain the present apparatus, the following description of its operation is referred to.

*Operation*

Assuming that line wires 135 and 136 are energized, transformer 140 is energized by the circuit: line wire 135, bus bar 133, fuse 137, wire 171, primary winding 170 of transformer 140, wire 172, fuse 138, bus bar 134, and line wire 136. With transformer 140 energized, a control circuit for the present device is energized as follows: secondary winding 174 of transformer 140, wire 175, wire 176, wire 177, switch 154 of safety limit device 153, wire 178, wire 179, switch 111, wire 180, wire 181, wiper 116, wire 182, winding 183 of relay 145, wire 184, wire 185, resistor 148, wiper 149, wire 186, wire 187, and wire 188 back to secondary winding 174. In addition to the circuit described, it is noted that a parallel circuit from wiper 116 exists as follows: wiper 116, resistor 117, wire 189, winding 190 of relay 145, wire 191, wire 192, and wiper 149. Thus, the voltage applied to wipers 116 and 149 is divided by two parallel paths, one of the paths including resistor 117 and relay winding 190 and the other path including resistor 148 and winding 183. As windings 183 and 190 have equal resistances, and as the resistance values of resistors 117 and 148 are likewise equal, it follows that the current flow through each of the parallel branches is uniform, relay 145 remains in a state of balance and its contact arm 194 is disengaged from contact 195.

Should the temperature of the room in which thermostat 147 is located now decrease a predetermined amount, spring 151 is able to force a retraction of bellows 150 and move wiper 149 downwardly across resistor 148 in accordance with the temperature drop. As wiper 149 moves downwardly across resistor 148, the resistance in the branch of the circuit including winding 183 of the relay is lessened and the resistance of the branch including winding 190 is increased; hence, more current flows through winding 183 than through 190, thereby unbalancing the relay and causing switch arm 194 to engage contact 195. When this occurs, heating element 56 is energized by the circuit: secondary winding 174 of transformer 140, wire 175, wire 176, wire 177, switch 154, wire 178, wire 179, switch 111, wire 180, wire 196, switch arm 194, contact 195, wire 197, heating element 56, wire 198, and wire 188 back to the secondary winding 174.

Figure 3:
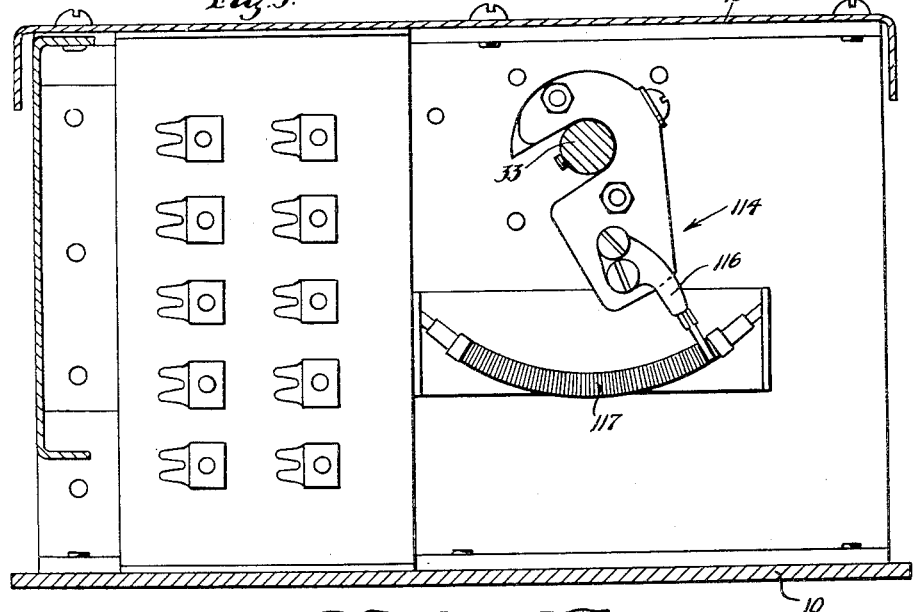
Figure 3 is a cross section taken on the line 3—3 of Figure 1.

The energizing of heating element 56 causes heat motor 50 to start operating toward the back of chassis 10 (upwardly in Fig. 5). Referring to Figure 4, it is noted that movement of heat motor 50 to the right causes a similar shifting of links 62 and 64 to the right. The first effect of this movement is to move pin 72 from engagement with face 75 of lever 73 which permits switch 112, by its own weight, to tip to a circuit closing position. Closing of switch 112, referring again to Figure 7, causes solenoid apparatus 93 to be energized by the circuit: secondary winding 174, wire 175, wire 176, wire 177, switch 154, wire 178, wire 179, switch 111, wire 199, switch 112, wire 200, winding 201 of solenoid apparatus 93, wire 202, and wire 188 back to the secondary winding 174. The energizing of solenoid 93, referring again to Figure 4, causes plunger mechanism 90 to be moved upwardly, thus bringing pin 92 into engagement with link member 64 and pulling it upwardly. Moving link member 64 upwardly brings abutment face 71 of notch 70 into engaging relation with crank pin 52. After abutment 71 of notch 70 engages crank pin 52, the effort required to cause shaft 33 to rotate causes links 62 and 64 to straighten out at pivot 65, causing link 64 to be lifted off of pin 92, thereby relieving the solenoid of the effort required to hold link 64 upward and in operative engagement with pin 52. In addition, the straightening of links 62 and 64 provides enough clearance above pin 92 in its raised position to accommodate the slight lowering of link 64 due to rotation of crank arm 53, thereby preventing the solenoid from being pulled off its seat. Motion of links 64 and 62 to the right obviously causes a counterclockwise rotation, in Figure 4, of shaft 33. Counterclockwise motion of cam shaft 33, clockwise in Figures 2 and 3, causes a movement of wiper 116 across resistor 117 in a direction (upwardly in Fig. 7) to equalize the resistances in the two branches of the circuit controlling relay 145. At the same time, referring to Figure 2, clockwise rotation of cam shaft 33 results in high portion 42 of cam 38 engaging follower 22 in a direction to rotate follower member 16 in a counterclockwise direction for closing the contacts of switch 14. With high portion 42 in full engagement with follower 22, follower 23 then engages low portion 39 of cam 37 and switch 14 is tilted in a manner to close its contacts.

Assuming that the switches 13 and 14 are adjusted to be simultaneously operated and switch 15 is adjusted to be operated upon a few degrees more rotation in the same direction, it is seen that the closing of switches 13 and 14 energizes heater element 157 by the circuit: line wire 135, bus bar 133, fuse 137, lead 210, switch 14, lead 205, wire 206, heater element 157, wire 207, lead 208, switch 13, lead 209, fuse 138, bus bar 134, and line wire 136. The few degrees further rotation referred to, which causes a closing of switch 15, then causes the energizing of heater element 158 by the circuit: line wire 135, bus bar 133, fuse 137, lead 211, switch 15, lead 212, wire 213, heater element 158, wire 214, wire 207, lead 208, switch 13, lead 209, fuse 138, bus bar 134 and line wire 136.

While movement of heat motor 50 has caused an operation of switches 13, 14 and 15 in the manner described, a similar movement of wiper 116 has been taking place along resistor 117 in a direction to balance the flow of current through relay windings 183 and 193. When this balancing takes place, arm 194 disengages contact 195, thereby deenergizing heater element 56. Upon heater element 56 being deenergized, the bimetal of heat motor 50 immediately starts cooling and thus permits a movement of shaft 33 in a reverse direction due to the tension of spring 26. However, a reverse operation of shaft 33 due to the effect of spring 26 causes a similar movement of wiper 116 across resistor 117 which results in unbalancing the flow of current through windings 183 and 190 of relay 145 so that added current again flows through winding 183 and causes arm 194 to engage contact 195 and thus reestablish the current supply to heater element 56. The normal operation of the heat motor thus requires alternate heating and cooling with enough movement due to the heating to cause the follow-up potentiometer to balance the circuits through relay 145 and with the cooling of the heat motor progressing far enough to cause sufficient movement of the follow-up potentiometer 114 to again unbalance the circuit through the said relay. By careful design, this "hunting" movement is small enough that the main load switches will normally not be operated by the "hunting" movement alone.

Assuming that the temperature fall in the space wherein thermostat 147 is located was sufficient to bring on heater elements 157 and 158 to thus add heat to the space, but that the temperature in the space continues to drop due to the heat from elements 157 and 158 being inadequate, this results in a further contraction of bellows 150 and a consequent further movement of wiper 149 downwardly across resistor 148. This will of course, in a manner previously related, unbalance relay 145 in a direction to cause further heating of element 56 and will result in rotation of shaft 33 sufficient to effect a rebalancing of the control network in the manner above described. This additional movement will, of course, result in closing more of the load switches in sequence and thus bring on more heat as the load requires. Should the temperature in the space to which thermostat 147 responds be sufficiently low as to cause movement of wiper 149 to the bottom of resistor 148, the circuit through relay 145 would remain unbalanced until wiper 116 advanced to the top of resistor 117 (Fig. 7), this requiring the full permissible movement of cam shaft 33 and a closing of all of the switches controlled thereby. This represents the full load position of the controller.

A rise in temperature of the space results in an expansion of bellows 150 and an overpowering by the same of spring 151 to thus force wiper 149 upwardly across resistor 148 with the effect of unbalancing the network circuit including relay 145 so that heat motor 50 is permitted to cool sufficiently to advance wiper 116 downwardly across resistor 117 to rebalance the circuit. Consequent movement of shaft 33 causes a sequential opening of the load switches and thus decreases the heat supplied to the space.

If, during the operation of the controller and the heating elements controlled thereby, something should cause an overheating of the furnace in which the heating elements 157, 158 etc. are located, limit device 153 operates to open the contacts of switch 154 and the load switches are all immediately opened for the opening of switch 154 deenergizes the control circuits of the controller including solenoid 93. When solenoid 93 is deenergized, plunger mechanism 90 drops by its own weight and pin 91 engages the top side of pry lever 95 and forces it downwardly. With lever 95 being forced downwardly, it rotates about crank pin 52 so that pin 96 engages the bottom of notch 70 in a manner to pry link member 64 downwardly, this breaking the engagement of abutment face 71 with crank pin 52. Pin 91 continues downwardly until it encounters the upper portion of link member 64 and directly acts against said member to force it downwardly. As soon as abutment face 71 of link 64 clears crank pin 52, spring 26 is enabled to rotate cam shaft 33 in a switch opening direction, to the full extent of travel permitted by limit link 104. This opens all of the load switches immediately. In addition, with link 64 being moved downwardly by plunger apparatus 90, pin 72 engages the upper surface 83 of lever 81 and rotates it clockwise to thus operate switch 111 to open its contacts. As will be seen in Figure 7, even if the switch 154 of safety limit device 153 should now close, the control apparatus cannot be reenergized for switch 111 is in series with switch 154 and all of the control circuits are also energized through switch 111 which is now open. Therefore, even if the temperature in the furnace, or other dangerous location, drops to a safe value, the heating load cannot be put back on the line because the load switches are all open and link member 64 is disengaged from crank pin 52. As heater element 56 remains deenergized because of switch 111 being opened, heat motor 50 continues to cool and to advance, in Figure 4, to the left, thus moving link 64 to the left. Upon link member 64 moving far enough to the left that pin 72 slides off of surface 83 and into registry with notch 84 of lever 81, lever 81 is then caused to rotate counterclockwise by the unbalanced weight of switch 111 which moves in a direction to close its contacts. Closing of the contacts of switch 111 assuming that pin 72 has not yet engaged surface 75 and that switch 112 therefore remains closed, then causes the control circuit first described in this description to be reestablished; solenoid 93 is reenergized by a circuit previously traced; hence, plunger mechanism 90 is pulled upwardly and forces abutment face 71 into engagement with crank pin 52. The reestablishment of a circuit to heater element 56 permits it to again cause heat motor 50 to bias in a direction to close the load switches and thus energize the heating elements for the space to an extent depending upon the load condition as determined by thermostat 147.

Because of the normal delay in movement of a heat motor and the sequential arrangement of the load switches, load is imposed on the electrical supply line in relatively small and spaced increments and thus avoids a sudden overloading of the line. Likewise, after a limit switch operation, the large load that may have been connected to the supply line at the time of the operation cannot be imposed on the line at one time, due to the operation just described, and the load can be reestablished only by starting at the beginning and building it up by the predetermined increments.

Likewise, in the event of a power failure, the deenergizing of solenoid 93 causes plunger mechanism 90 to move link member 64 out of engagement with crank pin 52 and permit the spring 26 to open all of the load switches immediately. Then, as described under the limit switch operation, the heat motor must be cooled to an initial position before switch 111 can be closed and permit a reestablishment of the control circuit and then cause the operation, in the manner above described, of the load switches sufficiently to meet the demands. This feature of immediately opening all the line switches upon power failure, or limit switch action, and permitting reestablishment of the load only upon a delay and by predetermined increments is of particular importance where a number of house heating loads are connected to a power supply line, for the immediate reestablishment of the full connected load of many houses to a power supply line after a power failure may make it difficult to reestablish the power supply.

This disclosure is intended to be illustrative only and, as many substitutions and equivalents will be readily apparent to those skilled in the art, the scope of this invention is to be determined only by the appended claims.

I claim as my invention:

1. A step controller comprising, in combination, a first shaft means having spaced circumferential grooves therein; cam follower means having a base portion, spaced sidewalls, offset oppositely arranged cam engaging portions extending upwardly from said sidewalls, spaced inwardly directed tongues, said spaced tongues and said base portion forming a groove through which said shaft extends, securing means extending between said sidewalls and disposed in one of said circumferential grooves and main switch means operable by said follower means; a plurality of main switch terminal means; a plurality of fuses, means superimposing said fuses over said terminal means and means connecting said fuses to said switches; a cam shaft disposed adjacent said first shaft and having a plurality of pairs of cams so arranged that one of the cams of a pair is engageable with one of said cam engaging portions and the other cam of the pair is engageable with the other cam engaging portion, each of said cams having a high and a low portion, said high and low portions being so proportioned and arranged that a high cam portion always engages one follower portion while the low portion of the other cam of the pair engages the other follower portion; means for biasing said cam shaft in a switch opening direction; a crank pin attached to said cam shaft; bimetal heat motor means; link means for connecting said heat motor to said crank pin; said link means including relatively rotatable members connected for limited rotative movement relative to each other, spring means for biasing said members in one direction, one of said members being pivotally attached to said heat motor and the other of said members having a notch means for engaging said crank pin; solenoid actuated means for moving said link means so that said notch means may engage or disengage said crank pin; pivoted lever means also actuable by said solenoid means for assisting in disengaging the said link means from said crank pin; pin means carried by said link means; a normally closed switch means, means engageable by said link pin means when said link means is in an extreme position for opening said normally closed switch means; a normally open switch means and means engageable by said link pin means upon a predetermined movement of said link means when said link means is disengaged from said crank pin for closing said normally open switch means; means connecting said normally open and said normally closed switch means in controlling relation with said solenoid means; balanced relay means for controlling the energization of said heat motor; follow-up means operable by said cam shaft, and means connecting said follow-up means in voltage dividing relation to said relay means.

2. In a control mechanism, a member to be moved from an initial biased position to an advanced position against its bias, an actuator movable from an initial position to an advanced position and having an engaged condition in which it actuates said member and a disengaged condition in which said member may move to its initial biased position independently of said actuator, electromagnetic means for placing said actuator in its engaged condition when energized and which releases said actuator to its disengaged condition when deenergized, a switch in circuit with said electromagnetic means, and connections between said actuator and switch for opening the switch upon the actuator assuming its disengaged condition while said actuator is out of its initial position and for closing said switch when said actuator moves back to its initial position while remaining in its disengaged condition, whereby upon failure of electrical power while said member has been advanced against its bias from its initial position by said actuator, the actuator will assume its disengaged condition allowing said member to immediately return to its biased initial position and said electromagnetic means will remain deenergized even though electrical power is resumed and until said actuator returns to its initial position.

3. A control device comprising, in combination, actuating means, motor means, means for biasing said actuating means in one direction, means including a plural member linkage for detachably connecting said motor means to said actuating means, means for biasing said linkage out of alignment, and electromagnetic means for controlling said connecting means in a manner to connect said motor means to the actuating means when said electromagnetic means is energized and to detach said connecting means when deenergized, said linkage being arranged to straighten out and to move out of engagement with said electromagnetic means when force is applied to said connecting means by said motor means.

4. In a control device, in combination, a movable actuating means, a motor means, a plural member linkage means for connecting said motor means to said actuating means, means for biasing said linkage out of alignment, and electromagnetic means for moving said linkage means into operative relation with said actuating means, said linkage being arranged to straighten out and to move out of engagement with said electromagnetic means when force is applied to said linkage by said motor means.

5. In a control device, in combination, a movable actuating means, a motor means, means for detachably connecting said motor means to said actuating means, said connecting means comprising a plurality of links normally biased out of alignment, and electromagnetic means for controlling said connecting means, said connecting means tending to straighten out and move out of engagement with said electromagnetic means when operatively connecting said motor means to said actuating means and force is exerted by said motor means.

6. In a control device, a plurality of energy controlling switch means operable in sequence from one position to another, motor means, means including clutch means for connecting said motor means in operative relation to said switch means, means for biasing said switch means to a position considered "safe," and means requiring energization for operating said clutch means in a manner to render said connecting means effective, said clutch operating means operating to disconnect said motor means from said switch means when deenergized.

7. A controller comprising, in combination, a shaft having spaced transverse grooves therein, a plurality of cam follower means pivotally mounted on said shaft and having means extending into said grooves to maintain said follower means in spaced relation, cam means arranged to coact with said follower means, motor means, means including clutch mechanism for connecting said motor means in operative relation to said cam means, means for biasing said cam means in one direction, electrically controlled means for controlling said clutch mechanism, and means operable as a function of the position of said connecting means for controlling said clutch mechanism.

8. In a control device, shaft means having a transverse groove therein; switch carrying means having a base portion, spaced sidewall portions, spaced tongues turned inwardly from said sidewall portions, said tongues and said base portions being arranged in substantial abutting relation with said shaft means, and means extending between said sidewall portions and into said transverse groove for holding said follower means on said shaft in a manner to permit at least limited rotation of said switch carrying means relative to said shaft; switch means attached to said carrying means; and means for actuating said carrying means.

9. In control apparatus, a driven member to be moved from an initial position to other positions, means for biasing said member to said initial position, an actuator member movable from an initial position to other positions, said actuator member having an engaged condition in which it may actuate said driven member and a disengaged condition in which said driven member may move to its initial position because of said biasing means and independently of said actuator member, electromagnetic means for placing said actuator member in its engaged condition when energized and which releases said actuator member to its disengaged condition when deenergized, a switch in circuit with said electromagnetic means, means for operating said switch to open circuit position upon the actuator member assuming its disengaged condition while it is still away from its initial position and for closing said switch when said actuator member moves back to its initial position while remaining in its disengaged condition, and means actuated by said electromagnetic means for forcing said actuator member out of engagement with said driven member when said electromagnetic means is deenergized.

10. A control system comprising, in combination, condition changing means, a controller for said condition changing means, heat motor means for actuating said controller, potentiometer means actuated by said controller means, condition responsive potentiometer means, balanced relay means having opposed windings and a switch means, circuit means connecting said switch means in on-off control of said heat motor means, and conductor means connecting both of said potentiometers and said relay windings to form a voltage dividing network capable of controlling said relay means.

11. In control apparatus, a driven member to be moved from an initial position to other positions, means for biasing said member to said initial position, an actuator member movable from an initial position to other positions, said actuator member having an engaged condition in which it may actuate said driven member and a disengaged condition in which said driven member may move to its initial position because of said biasing means and independently of said actuator member, electromagnetic means for placing said actuator member in its engaged condition when energized and which releases said actuator member to its disengaged condition when deenergized, a switch in circuit with said electromagnetic means, means for operating said switch to open circuit position upon the actuator member assuming its disengaged condition while it is still away from its initial position and for closing said switch when said actuator member moves back to its initial position while remaining in its disengaged condition, and means for disengaging said actuator member from said electromagnetic means when force is applied through said actuator member to said driven member.

12. A multiple switch control device comprising, in combination, a plurality of switches, means for actuating said switches from an "off" position to various "on" positions, motor means, holding means operable against a bias for detachably connecting said motor means in operative relation to said actuating means, means for biasing said switch actuating means to the "off" position, and means forming part of said holding means for disconnecting said motor means from said actuating means in the event of a power failure.

13. A control device including a motor means, means arranged to be driven by said motor means, means including clutch means for connecting said motor means to said driven means, electromagnetic means for controlling said clutch means, and switch means controlled by said connecting means for preventing an initial energization of said electromagnetic means unless said connecting means is in a predetermined position.

14. Control apparatus comprising, in combination, motor means, a driven mechanical means, means including a clutch means for connecting said motor means to said driven means, electromagnetic means for controlling said clutch means, circuit means for energizing said motor means, said clutch means being operable to connect said motor means in driving relation to said driven means only when said electromagnetic means is energized, and means controlled by said connecting means for preventing energization of said motor means unless the clutch means is engaged or the connecting means is in a predetermined position.

15. A control device, comprising, in combination, actuating means, heat motor means movable in one direction upon being energized and movable in the other direction upon being deenergized, means for biasing said actuating means in one direction, means for detachably connecting said motor means to said actuating means, electromagnetic means for controlling said connection means in a manner to connect the motor means to the actuating means when said electromagnetic means is energized and to detach said connecting means when deenergized, and switch means operable by said connecting means for controlling the energization of said electromagnetic means.

16. Control apparatus comprising, in combination, a control device, said device including an actuating means, a motor means, electromagnetic controlled means for connecting said motor means to said actuating means when energized, spring means for biasing said actuating means to a predetermined position, condition responsive means for controlling said motor means, and an additional condition responsive means for controlling the energization of said electromagnetic means.

17. A multiple switch control device comprising, in combination, a plurality of switches, means for actuating said switches from an "off" position to various "on" positions, motor means, electrically controlled means for detachably connecting said motor means in operative relation to said actuating means for operating said switch means to "on" positions, spring means for biasing said switch means to "off" position, said electrically controlled means causing a detaching of said connecting means upon being deenergized for permitting said spring means to operate said switches to "off" position, and means preventing reenergization of said electrically controlled means until said motor means moves to a position in accordance with the "off" position of the said switches.

18. A control device comprising, in combination, actuating means, heat motor means for urging said actuating means in one direction when energized, spring means for urging said actuating means in an opposite direction, relay means for controlling the energization of said heat motor in an on-off manner, and voltage dividing follow-up means operated by said actuating means and connected in controlling relation with said relay.

19. A step controller comprising a plurality of switches, means for actuating said switches in a predetermined sequence from an initial position, motor means, means for detachably connecting said motor means to said actuating means for operation thereof, electrical means for controlling said detachable connection means, and means requiring said switch means to be in the initial position of the sequence before said detachable connection means can be effectively controlled to place the motor means in operative relation to the switch actuating means.

ALEXANDER J. BIELSKI.

REFERENCES CITED

The following references are of record in the file of this patent:

UNITED STATES PATENTS

| Number | Name | Date |
| --- | --- | --- |
| 1,817,635 | McCabe | Aug. 4, 1931 |
| 1,942,587 | Whitman | Jan. 9, 1934 |
| 2,026,373 | Bush | Dec. 31, 1935 |
| 2,032,658 | Gille | Mar. 3, 1936 |
| 2,169,039 | Defandorf et al. | Aug. 8, 1939 |